United States Patent [19]

Müller

[11] Patent Number: 4,528,483
[45] Date of Patent: Jul. 9, 1985

[54] MULTIPLE-SHAFT DRIVE

[75] Inventor: Rolf Müller, St. Georgen, Fed. Rep. of Germany

[73] Assignee: Papst Motoren GmbH & Co. Kg, St. Georgen, Fed. Rep. of Germany

[21] Appl. No.: 456,753

[22] Filed: Jan. 10, 1983

Related U.S. Application Data

[63] Continuation-in-part of Ser. No. 166,092, Jul. 3, 1980, abandoned.

[30] Foreign Application Priority Data

Jul. 17, 1979 [CH] Switzerland ............ 6624/79
Jul. 5, 1980 [DE] Fed. Rep. of Germany ....... 3026679

[51] Int. Cl.³ ............................................. H02P 1/54
[52] U.S. Cl. ..................... 318/112; 318/254; 318/138; 310/112; 310/75 R
[58] Field of Search ............... 310/112, 114, 126, 75; 318/254, 254 H, 138, 112

[56] References Cited

U.S. PATENT DOCUMENTS

| | | | |
|---|---|---|---|
| 3,391,318 | 7/1968 | Hirokawa | 318/112 |
| 3,477,536 | 11/1969 | Curini | 310/112 X |
| 3,651,355 | 3/1972 | Mason | 310/112 |
| 4,187,441 | 2/1980 | Olney | 310/112 |
| 4,221,984 | 9/1980 | Mason | 310/112 |
| 4,395,664 | 7/1983 | Terbush | 318/112 |
| 4,408,144 | 10/1983 | Lukes | 318/112 X |

*Primary Examiner*—Donovan F. Duggan
*Attorney, Agent, or Firm*—Michael J. Striker

[57] ABSTRACT

In order to create an economical drive unit for multiple shaft drive units for high speed loads that may be operated without wear and running noise, each drive shaft is designed as a rotor of a commutatorless direct current motor. One rotor of the unit is provided with a position sensor, all motors of the unit being connected in parallel with a commutating circuit, and all rotors being linked by a mechanical coupling of low power-transmitting capacity, such as a belt.

7 Claims, 2 Drawing Figures

MULTIPLE-SHAFT DRIVE

CROSS-REFERENCE TO RELATED APPLICATIONS

This is a continuation-in-part of application Ser. No. 166,092, filed July 3, 1980, now abandoned.

BACKGROUND OF THE INVENTION

The invention relates to a multiple-shaft drive unit for high-speed loads.

Units of the type described herein find application where a plurality of identical drive means must be used simultaneously. In textile technology, texturizing spindles are, for instance, being driven by electric power and it is here where multiple-shaft drive units are being used.

Hitherto, drive units consisted of, for instance, a central motor and a plurality of further load spindles, driven by said central motor. Driving of the load spindles is effected over a belt which is toothed in order to obtain synchronized running of the spindles. Strong running noises are generated thereby, the toothed belt will wear out, and high spindle speeds cannot be attained.

The invention has, therefore, set as its task the creation of a multiple-shaft drive unit that can be operated highly synchronously at low noise levels, and attaining high rotating speeds. The drive unit should, furthermore, be economical in production.

SUMMARY OF THE INVENTION

In this invention, each drive shaft is constructed as the rotor of a commutatorless direct current motor. One rotor of the unit is provided with a positioning sensor, all motors of the unit are connected in parallel with a commutation circuit, and the rotors of the unit are all linked together by a mechanical coupling of low power-transmission capacity.

Such a unit has the advantage that the noise level may be kept low by using non-toothed belts, that starting will ensue without difficulties, that no high loads will be imposed upon the supply grid and that synchronization will still be attained. Furthermore, high rotating speeds are possible.

Very high rotating speeds can be attained, particularly when coupling is effected by a light flat belt, since the coupling will be adequate for dampening the oscillating momentum of the rotors against each other that may jeopardize synchronism even then, when the high centrifugal forces will cause the belt to be in contact only over a short arc of the periphery.

This characteristic of this invention is based upon the fact that an alternating current network is formed by that rotor which is provided with a position sensor in conjunction with the commutation circuit, and by the two remaining motors acting like synchronous motors in this network. Since collectorless direct current motors do not have a damping cage like normal synchronous motors, load angles will occur that oscillate relative to the internal network frequency. If such instabilities are prevented by mechanically coupling the rotors, the entire unit will constitute a very stable drive. Since the coupling member is not transmitting load forces as such, the coupling member has an exclusively controlling function. If differences in load should actually occur, they will balance after a few rotations by means of the slip of the coupling member, until each rotor of the unit has attained a load angle corresponding to the then prevailing load. On the other hand, the unit cannot be used without the light coupling member, since one of the rotors may fall out of step even at moderate load fluctuations and will then come to a quick stop without being restartable, like a synchronous motor that is operated asynchronously. (Due to the frequency determined by the commutator and the position sensor, this would be possible only after all rotors could be run up to normal speed).

In a particularly advantageous embodiment of the invention, the commutatorless direct current motors are elements of a multiple shaft drive.

Multiple shaft drives have already been proposed. They consist of a plurality of rotors and one common stator. Magnetic optima may be attained by the arrangement of the armature or armatures, by, for instance, leading the magnetic flux from a plurality of magnetically independent drives in opposing directions. The common stator will also constitute a base plate of a mechanical strength (necessitated by grounds of magnetism) that will allow it to be used as a construction component. This is of particular advantage for drive units such as this invention, since narrow design dimensions may be attained thereby, and production cost of the motors will be lowered to a considerable degree.

This is the case with two rotors, but it is of even greater advantage with three rotors.

It is also possible to simplify the multiple shaft drive by using only one winding for the entire stator. In this instance, the additional expenditure versus free-running spindles driven by belts is incurred only by using permanent magnets on the respective spindle. The bearings of the spindles may be readily accommodated on the common bearing bridge of the multiple shaft drive.

Taken in toto, the advantages of the invention over known arrangements is considerable: It is possible to attain very much higher rotating speeds, and the power supply can be constructed at a fraction of the expenditure required for independently driven drive units.

BRIEF DESCRIPTION OF THE DRAWINGS

In the drawings, with the aid of which the invention is explained, and which schematically represents the invention.

In FIG. 1 the four commutatorless direct current motors 100–103 are arranged in a multiple shaft drive. This consists of a common stator 10 and of a bearing bridge 110 carrying the rotor bearings. The bearings 120, 121, 122, . . . may for instance be designed as collar bearings which run precisely at high rotating speeds and are of a high parallelism that can not be varied.

Flanges 110 and 111 serve for attachment of the multiple shaft unit. A light flat belt 104 is slung around the four rotors 100, 101, 102, 103, thus effecting synchronization of their rotation.

Figure 1:
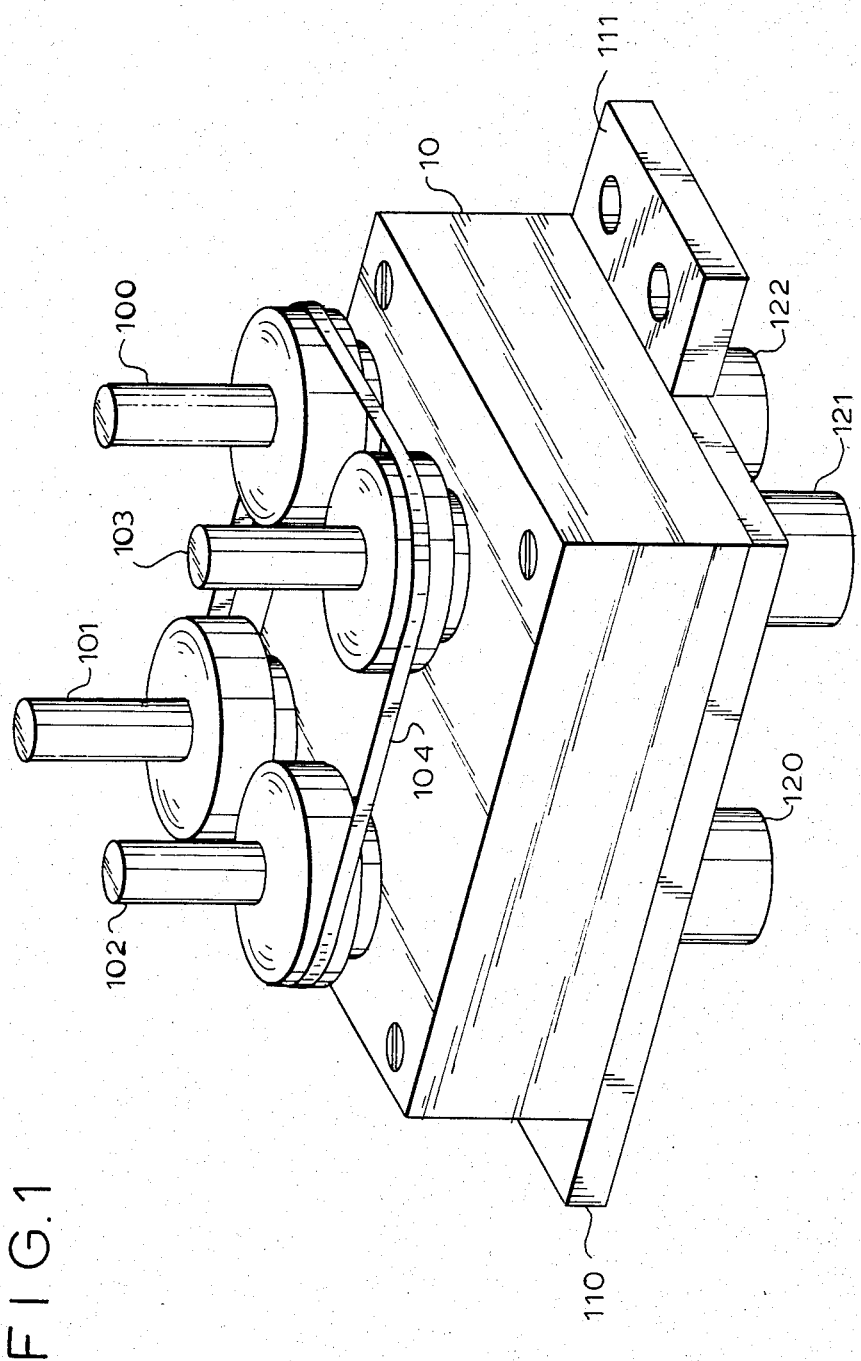
FIG. 1 is a perspective view of a multiple shaft drive with the coupling of four rotors by one flat belt.
Figure 2:
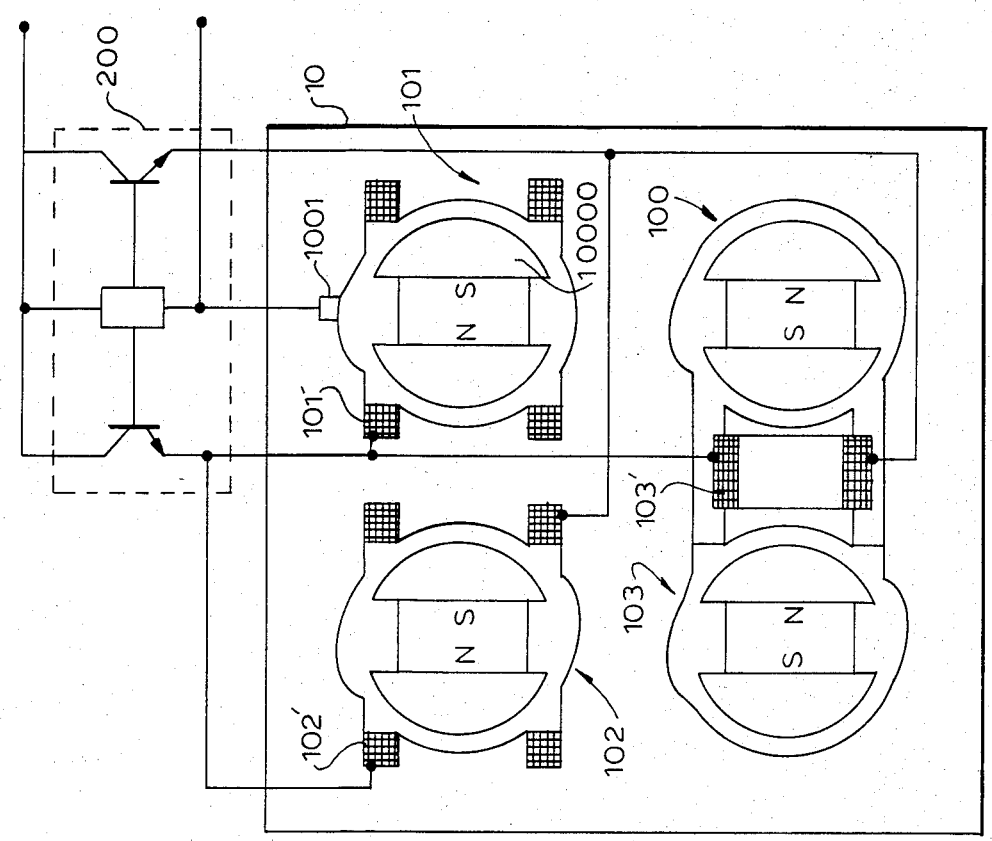
FIG. 2 is the circuitry of four motors of a commutatorless multiple shaft direct current unit.

In FIG. 2, the motors 101, 102, 103 are arranged in parallel with the power supply 200. The power supply 200 is a commutation circuit controlled by the position sensor 1001. Upon energization, the rotor of motor 101 will commence rotation and its north and south poles 1000 generate in sensor 1001 alternating current at a drive frequency which will also act via the commutation circuit 200 upon the remaining rotors. These will fall into step so that all rotors run faster at the same speed. Coupling of the rotors would therefore not be required so far. It is only when load fluctuations occur during operation that are of a magnitude to cause one of the rotors to fall out of step that difficulties will arise, since the rotor that has fallen out of step cannot fall back into step and will, in the manner of an asynchronously operated synchronous motor come to a quick stop. This is precluded by the flat belt preventing fluctuations of the load angle and also preventing a buildup of oscillations of the individual rotors relative to the mean rotating speed, so that the rotors cannot fall out of step. The flat belt must be so dimensioned that it can absorb the energy generated at maximum angular oscillations relative to the mean rotating speed. These oscillations are not large in the numerous drive problems that are to be resolved by means of these drive units, for instance in the case of texturizing spindles, so that light flat belts will be adequate.

The arrangement as per invention is of particular importance when double-impulse motors with auxiliary momentum of reluctance are being used. Such motors will maintain phase-confirming rotation of rotors even when the rotors need a longer time to come to a stop after power has been shut off. Such motors will, furthermore, start from the same zero position, so that in these instances too, the belt will have to balance only small diametrical tolerances of the pulleys. The double-impulse commutatorless DC motors of the aforedescribed type are known from prior art, for example from the article of Rolf Müller in the German publication of Firma Papst-Motoren KG, D-7742 St, Georgen, asr-digest, Copy 1-2/77, entitled "Zweipulsige kollektorlose Gleichstrommotoren", published in 1977.

FIG. 2 furthermore shows two normal coils 101', 102' which generate flux in the same direction, and a single coil 103' for the two other motors, which coil 103' is arranged with its flux opposite to that of coils 101', 102'. This serves to reduce the flux between the upper and lower pairs of motors, so that small iron cross-sections will suffice.

It is also possible to use a single coil simultaneously for all motors.

In this invention, motors with internal rotors (as used in this embodiment) may be used, but motors with external rotors may also be used, this depending upon the desired application.

What is claimed as new and desired to be protected by Letters Patent is set forth in the appended claims.

I claim:

1. A multiple-shaft drive unit in which all shafts are synchronized with each other, comprising:
    a DC source;
    a first commutatorless DC motor with a rotor;
    a position sensor cooperating with the rotor to generate alternating current at a drive frequency of the rotor;
    a commutation circuit connected to the position sensor, the DC source and the first motor to commutate DC current from the DC source in synchronism with said drive frequency and thereby operate the first motor;
    at least one additional commutatorless DC motor with a rotor, said at least one additional motor being connected to the commutation circuit in parallel with the first motor; and
    a light mechanical coupling linking all the rotors together and synchronizing rotation thereof.

2. The multiple-shaft drive unit defined by claim 1, wherein all motors are located in a common housing.

3. The multiple-shaft drive unit defined by claim 1, wherein the coupling is a light flat belt looped around at least two shafts, each shaft being independently driven by a one of the rotors.

4. The multiple-shaft drive unit defined by claim 1, wherein there are at least three driven motors, namely a first driven motor, a second driven motor and a third driven motor.

5. The multiple-shaft drive unit defined by claim 4, wherein the second driven motor and the third driven motor share a common stator coil, and wherein the first motor has an individual stator coil.

6. The multiple-shaft drive unit defined by claim 5, wherein flux emitted from the common stator coil is opposed to flux emitted by each of the individual stator coils.

7. The multiple-shaft drive unit defined by claim 2, wherein all motors are of double-impulse type.

\* \* \* \* \*